United States Patent
Cao et al.

(10) Patent No.: US 12,487,479 B2
(45) Date of Patent: Dec. 2, 2025

(54) INTEGRATED OPTICAL CIRCULATOR

(71) Applicant: ACCELINK TECHNOLOGIES CO., LTD., Wuhan (CN)

(72) Inventors: Junhong Cao, Wuhan (CN); Long Chen, Wuhan (CN); Qingming Xiao, Wuhan (CN); Hui Xie, Wuhan (CN); Jieqiao Fan, Wuhan (CN); Min Wang, Wuhan (CN)

( * ) Notice: Subject to any disclaimer, the term of this patent is extended or adjusted under 35 U.S.C. 154(b) by 417 days.

(21) Appl. No.: 18/016,858

(22) PCT Filed: Dec. 10, 2020

(86) PCT No.: PCT/CN2020/135492
§ 371 (c)(1),
(2) Date: Jan. 18, 2023

(87) PCT Pub. No.: WO2022/021738
PCT Pub. Date: Feb. 3, 2022

(65) Prior Publication Data
US 2023/0296931 A1  Sep. 21, 2023

(30) Foreign Application Priority Data

Jul. 29, 2020 (CN) .......................... 202021539312.7

(51) Int. Cl.
| | | |
|---|---|---|
| *G02F 1/095* | (2006.01) | |
| *G02F 1/09* | (2006.01) | |
| *G02B 27/28* | (2006.01) | |

(52) U.S. Cl.
CPC ............ *G02F 1/0955* (2013.01); *G02F 1/092* (2013.01); *G02B 27/283* (2013.01)

(58) Field of Classification Search
CPC ........ G02B 6/126; G02B 6/4208–4209; G02B 27/283; G02F 1/0955; G02F 1/092; G02F 1/095
See application file for complete search history.

(56) References Cited

U.S. PATENT DOCUMENTS

| | | | |
|---|---|---|---|
| 6,587,266 B2 * | 7/2003 | Tai .......................... | G02F 1/093 359/489.09 |
| 2016/0047987 A1 | 2/2016 | Du et al. | |

FOREIGN PATENT DOCUMENTS

| | | |
|---|---|---|
| CN | 101231369 A | 7/2008 |
| CN | 102998746 A | 3/2013 |

(Continued)

OTHER PUBLICATIONS

International Search Report of PCT/CN2020/135492 filed Dec. 10, 2020.

(Continued)

*Primary Examiner* — Michael P Mooney
(74) *Attorney, Agent, or Firm* — Chang & Hale LLP

(57) ABSTRACT

An integrated optical circulator comprising at least two single-fiber bidirectional optical fiber interfaces, a refractive element group, an optical isolation element group, and an optical fiber array, wherein the refractive element group and the optical isolation element group are sequentially arranged on a same optical path; incident signal light from each optical fiber interface sequentially passes through the refractive element group and the optical isolation element group, then is output by a corresponding outgoing optical fiber of the optical fiber array; incident signal light from each incident optical fiber of the optical fiber array sequentially passes through the optical isolation element group and the refractive element group, then is emitted by a corresponding optical fiber interface. Multiple optical circulators are integrated within the volume of a same optical circulator, reducing the volume occupied by optical circulators, lowering overall cost of the device, and improving convenience of optical path integration.

9 Claims, 3 Drawing Sheets

(56) References Cited

FOREIGN PATENT DOCUMENTS

| CN | 105891956 A | 8/2016 |
|---|---|---|
| CN | 212905793 U | 4/2021 |
| JP | 2000231080 A | 8/2000 |

OTHER PUBLICATIONS

Written Opinion of the International Searching Authority of PCT/CN2020/135492 filed Dec. 10, 2020.

* cited by examiner

INTEGRATED OPTICAL CIRCULATOR

CROSS-REFERENCE

The present disclosure claims a benefit of, and priority to Chinese Patent Application No. 202021539312.7 filed on Jul. 29, 2020, the disclosure of which is hereby expressly incorporated by reference herein in its entirety.

TECHNICAL FIELD OF THE DISCLOSURE

The disclosure relates to the field of optical communications, and in particular, to an integrated optical circulator.

BACKGROUND

In optical communication systems, the reversibility of optical paths may greatly affect the transmission of information and the stability of system performances, and due to their non-reciprocity, optical circulators become important devices in bidirectional communication, and thus the separation of light transmitted in forward and reverse directions, optical path isolation of optical signals in the two directions of the single-fiber bidirectional optical fiber can be achieved, thereby avoiding influences resulted from reversible optical paths on the communication quality.

An existing optical circulator generally has only three interfaces, wherein the input light input by the first interface is output from the second interface, the input light input by the second interface is output from the third interface, therefore only the optical path of one single-fiber bidirectional optical fiber can be isolated. Where the optical paths of a plurality of single-fiber bidirectional optical fibers need to be isolated, a plurality of optical circulators need to be arranged on the optical path, and each optical circulator is connected to one single-fiber bidirectional optical fiber. The plurality of optical circulators increase the space occupied, and it is not convenient enough to use.

In view of the above, how to overcome the defect in the prior art which is how to solve the problem that an existing optical circulator can only isolate one path of bidirectional light, is an urgent issue to be solved in the art.

SUMMARY

With regard to the above defect or improvement requirement in the prior art, the present disclosure solves the problem that each existing optical circulator can only isolate an optical path of one single-fiber bidirectional optical fiber.

Embodiments of the present disclosure adopt the following technical solutions.

In a first aspect, the present disclosure provides an integrated optical circulator comprising at least two single-fiber bidirectional optical fiber interfaces 1, a refractive element group 2, an optical isolation element group 3 and an optical fiber array 4, wherein the refractive element group 2 and the optical isolation element group 3 are sequentially located on a same optical path; signal light input from each single-fiber bidirectional optical fiber interface 1 sequentially passes through the refractive element group 2 and the optical isolation element group 3, and then is output by a corresponding outgoing optical fiber of the optical fiber array 4; and signal light input from each incident optical fiber of the optical fiber array 4 sequentially passes through the optical isolation element group 3 and the refractive element group 2, and then is output by the corresponding single-fiber bidirectional optical fiber interface 1.

In an example, the refractive element group 2 comprises at least two refractive prisms 21, wherein the signal light input from each single-fiber bidirectional optical fiber interface 1 passes through the corresponding refractive prism 21 to reach the optical isolation element group 3, and then is output by the corresponding outgoing optical fiber in the optical fiber array 4; and the signal light input from each incident optical fiber in the optical fiber array 4 passes through the optical isolation group 3, and then is refracted to the corresponding single-fiber bidirectional optical fiber interface 1 by the corresponding refractive prism 21 to be output.

In an example, an angle of the refractive prism 21 is calculated according to a number of the single-fiber bidirectional optical fiber interfaces 1 and an optical path angle.

In an example, the optical isolation element group 3 comprises a first polarization splitting prism 31, a first half-wave plate 32, a first Faraday rotating plate 33, a second Faraday rotating plate 34, a second half-wave plate 35, and a second polarization splitting prism 36, wherein the first polarization beam-splitting prism 31, the first half-wave plate 32, the first Faraday rotating plate 33, the second Faraday rotating plate 34, the second half-wave plate 35 and the second polarization beam-splitting prism 36 are sequentially located on the same optical path, and the signal light output by the refractive element group 2 is output to the optical isolation element group 3 through the first polarization splitting prism 31, and then is output to the corresponding outgoing optical fiber in the optical fiber array 4 by the second polarization splitting prism 36; and the signal light output by the optical fiber array 4 is output to the optical isolation element group 3 through the second polarization splitting prism 36, and is then output to the refractive element group 2 by the first polarization splitting prism 31.

In an example, the integrated optical circulator further comprises a lens array 5, wherein the lens array 5 is located on an optical path between the optical isolation element group 3 and the optical fiber array 4, and the signal light output by each optical fiber in the optical fiber array 4 passes through the lens array 5 to generate a corresponding collimated light beam.

In an example, a lens in the lens array 5 is an aspheric single-sheet plano-convex lens and/or an aspheric double-sheet plano-convex lens.

In an example, the single-fiber bidirectional optical fiber interface 1 is an SC ceramic ferrule, an LC ceramic ferrule, and/or an FC ceramic ferrule.

In an example, a pluggable end surface of the single-fiber bidirectional optical fiber interface 1 is a plane or an inclined plane.

In an example, the optical fiber array 4 is a conventional optical fiber or a micro-bending optical fiber.

Compared with the prior art, an embodiment of the present disclosure has the beneficial effects as follows: the light splitting element group is arranged in an optical circulator, so that a plurality of single-fiber bidirectional optical fibers can be subjected to optical path isolation by using the same optical circulator, which is equivalent to integrating a plurality of optical circulators within the volume of the same optical circulator, thereby reducing the volume occupied by the optical circulator in the whole equipment, and reducing the overall cost of the equipment. In a preferred embodiment, the optical path coupling efficiency is improved through the lens array, and the convenience and flexibility of the use of the optical circulator are improved by providing the pluggable interface.

BRIEF DESCRIPTION OF THE DRAWINGS

In order to more clearly illustrate the technical solutions of embodiments of the present disclosure, the accompanying drawings that need to be used in the embodiments of the present disclosure are briefly described below. Obviously, the drawings described below are merely parts of embodiments of the present disclosure, and for a person of ordinary skill in the art, other drawings may be obtained according to these drawings without any inventive effort.

Figure 1:
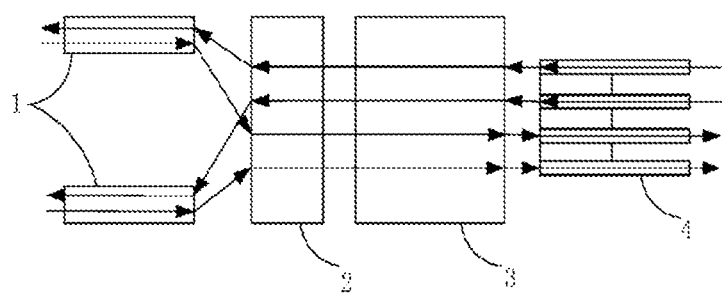
FIG. 1 is a schematic structural diagram of an integrated optical circulator according to an embodiment of the present disclosure.

The reference numerals are as follows:
1: a single-fiber bidirectional optical fiber interface,
  11: a first single-fiber bidirectional optical fiber interface,
  12: a second single-fiber bidirectional optical fiber interface;
2: a refractive element group,
  21: a refractive prism,
  21-1: a first refractive prism,
  21-2: a second refractive prism;
3: an optical isolation element group,
  31: a first polarization splitting prism,
  32: a first half-wave plate,
  33: a first Faraday rotating plate,
  34: a second Faraday rotating plate,
  35: a second half-wave plate,
  36: a second polarization beam-splitting prism;
4: an optical fiber array,
  41: a first incident optical fiber,
  42: a second incident optical fiber,
  43: a first outgoing optical fiber,
  44: a second outgoing optical fiber;
5: a lens array,
  51: a first lens,
  52: a second lens,
  53: a third lens,
  54: a fourth lens;
6: a housing.

DETAILED DESCRIPTION

In order to make the objectives, technical solutions, and advantages of the present disclosure clearer, the present disclosure will be further described in detail below with reference to the accompanying drawings and embodiments. It should be appreciated that the specific embodiments described herein are merely used to explain the present disclosure, rather than to limit the present disclosure.

The present disclosure provides an architecture of specific functional system. Therefore, in the embodiments, functional logic relationships of different structural modules are mainly described, but implementations of specific software and hardware are not defined.

In addition, the technical features involved in the embodiments of the present disclosure described below may be combined with each other as long as there is no conflict between each other. The present disclosure is described in detail below with reference to the accompanying drawings and embodiments.

The optical circulators have a wide range of applications in the fields of single-fiber bidirectional communication, upper/lower speech paths, EDFA, combined wave/partial wave, dispersion compensation and the like in the optical communication technology. With the improvement of optical element performances and processing and manufacturing technologies, the technical level of the optical circulators is continuously improved, the insertion loss is further reduced, and the isolation degree is further improved. In some application scenarios, the need for an optical circulator is to reduce the volume of the circulator and to improve the flexibility and convenience of use. The integrated optical circulator provided by the present disclosure can reduce the volume of the optical circulator and improve the convenience of use of the optical circulator.

The specific structure of the integrated optical circulator provided by the present disclosure is described below with reference to FIG. 1. For simplicity, in this embodiment, two single-fiber bidirectional optical fiber interfaces 1, and an optical fiber array 4 composed of two incident optical fibers and two outgoing optical fibers, are taken as an example to describe, and in a specific use scenario, the number of different single-fiber bidirectional optical fiber interfaces 1, and the number of the incident optical fibers and the outgoing optical fibers in the corresponding optical fiber array 4 may be selected according to actual needs, processing difficulty and the like. In a scenario that the number of the single-line bidirectional optical fiber interface 1 is different from that of optical fibers in the optical fiber array, other optical path elements may be added to change directions of optical paths, so as to ensure that the optical paths match each other correctly.

The integrated optical circulator comprises at least two single-fiber bidirectional optical fiber interfaces 1, a refractive element group 2, an optical isolation element group 3, and an optical fiber array 4, wherein the optical isolation element group 3 fulfillments basic functions of the optical circulator.

Figure 2:
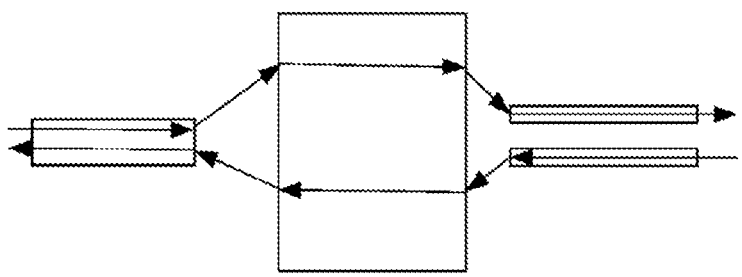
FIG. 2 is a schematic structural diagram of an existing optical circulator.

As shown in FIG. 2, an existing optical circulator comprises only one single-fiber bidirectional optical fiber interface, one incident optical fiber interface and one outgoing optical fiber interface. Incident light input from the single-fiber bidirectional optical fiber is directly input into an optical path of an optical isolation element, and is output by the outgoing optical fiber after being optically isolated; and on the other hand, incident light input from the incident optical fiber is output by the single-fiber bidirectional optical fiber through different optical paths after being optically isolated. There is only one optical path in each of the two directions, so that only the optical path isolation of one single-fiber bidirectional optical fiber can be realized.

In the integrated optical circulator provided in the present embodiment, the single-fiber bidirectional optical fiber connected to each single-fiber bidirectional optical fiber interface 1 corresponds to one incident optical fiber and one outgoing optical fiber in the optical fiber array 4 to form three interfaces for a group of optical circulators. A plurality of single-fiber bidirectional optical fiber interfaces 1, and a plurality of incident optical fibers and outgoing optical fibers in the corresponding optical fiber array 4 may form interfaces of a plurality of groups of circulators. In a preferred solution of the present embodiment, in order to ensure the corresponding relationship between each single-fiber bidirectional optical fiber interface 1 and the incident optical fiber and the outgoing optical fiber in the optical fiber array 4, simplify the optical path design, and avoid optical path conflict and optical path mutual influence, the number of the incident optical fibers and the number of the outgoing optical fibers of the optical fiber array 4 are the same as the number of the single-fiber bidirectional optical fiber interfaces 1; one group consists of a single-fiber bidirectional optical fiber interface 1, an incident optical fiber and an outgoing optical fiber, and it cooperates with the elements in the refractive element group 2 and the optical isolation element group 3 to form a set of optical circulator; and a plurality of single-fiber bidirectional optical fiber interfaces 1 may be combined with a corresponding number of incident optical fibers and outgoing optical fibers to form a plurality of groups of optical circulator structures. In other embodiments, the number of the single-fiber bidirectional optical fiber interface 1 and the number of the optical fibers in the optical fiber array 4 may be selected according to actual needs and specific optical path designs, as long as no optical path conflict occurs.

The refractive element group 2 and the optical isolation element group 3 are located on the same optical path, and the refractive element group 2 refracts incident light from different single-fiber bidirectional optical fiber interfaces 1 into optical paths of the isolation element group 3, and refracts the outgoing light from the optical isolation element group 3 into different single-fiber bidirectional optical fiber interfaces 1 to realize multiplexing of the optical isolation element group 3. Incident light from each single-fiber bidirectional optical fiber interface 1 sequentially passes through the refractive element group 2 and the optical isolation element group 3, and then is output by the corresponding outgoing optical fiber in the optical fiber array 4; and incident light input from each incident optical fiber in the optical fiber array 4 sequentially passes through the optical isolation element group 3 and the refractive element group 2, and then is output by the corresponding single-fiber bidirectional optical fiber interface 1. By the refraction of the refractive element 2, the incident and outgoing optical paths of multiple groups of interfaces are introduced into the optical path of the optical isolation element group 3 to realize the multiplexing of the optical isolation element group 3; that is, the functional effect of using a plurality of optical circulators can be realized through the elements and volumes of one common optical circulator, and the integration of optical circulators can be realized.

The integrated optical circulator provided in this embodiment realizes the optical isolation function of a plurality of optical circulators required by a plurality of single fiber bidirectional optical fibers by sharing a group of optical elements, instead of using multiple groups of optical elements to isolate the optical path of each single-fiber bidirectional optical fiber, thereby achieving the effect of reducing the volume of the optical circulator.

In the integrated optical circulator provided in this embodiment, the refractive element group 2 and the optical isolation element group 3 can be implemented by selecting specific optical elements according to the processing difficulty, cost, optical path accuracy requirements, etc. Different specific implementations are included in the protection scope of the present disclosure.

The following provides several specific implementations that can be selected in practical cases:

(1) Refractive Element Group 2

Figure 3:
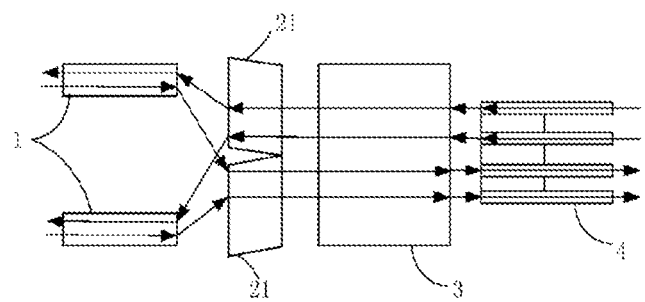
FIG. 3 is a schematic structural diagram of another integrated optical circulator according to an embodiment of the present disclosure.

As shown in FIG. 3, the refractive element group 2 is realized by using a refractive prism. In this embodiment, two refractive prisms 21 are used for one-to-one correspondence to the optical paths of the two single-fiber bidirectional optical fiber interfaces 1. The incident light from each single-fiber bidirectional optical fiber interface 1 reaches the optical isolation element group 3 through the corresponding refractive prism 21; and the incident light from each incident fiber in the fiber array 4 passes through the optical isolation element group 3, and is refracted by different refractive prisms 21 to the corresponding single-fiber bidirectional optical fiber interface 1 to output. Using the refractive prism 21 can meet the function of the refractive element group 2 to adjust the optical path angles of different single-fiber bidirectional optical fibers, and can reduce the volume, cost and processing difficulty of the integrated optical circulator at the same time. In a preferred solution of this embodiment, in order to simplify the optical path designs and avoid optical path conflicts, each refractive prism 21 corresponds to the optical path of one single-fiber bidirectional optical fiber interface 1, so the number of the refractive prisms 21 need to be used is the same as that of the single-fiber bidirectional optical fiber interface 1. In other embodiments, different numbers and positions of the refractive prisms 21 or other optical elements capable of refracting a light path can be set according to the specific optical path designs.

In some embodiments, the specific installation angle of the refractive prism 21 is calculated according to the number and the optical path angle of the single-fiber bidirectional optical fiber interfaces 1. In a preferred solution of this embodiment, in order to simplify optical paths, two single-fiber bidirectional optical fiber interfaces 1 are used to match two refractive prisms 21. In order to ensure that the final incident light paths and outgoing light paths in each group of optical circulators are parallel, taking account of the total reflection characteristic of light, the optical path of each single-fiber bidirectional optical fiber interface 1 needs to be turned 45 degrees according to the calculation of reflected optical path, so a setting angle of each refractive prism 21 is 45 degrees. In a specific implementation scenario of this embodiment, the angle of the refractive prism 21 needs to be specifically calculated and set according to the specific optical devices and optical path settings in the integrated optical circulator.

In order to simplify the calculation and implementation of the optical path, generally every two single-fiber bidirectional optical fiber interfaces, cooperating with two refractive prisms 21, two incident optical fiber fibers and two outgoing optical fibers are used as a group, and the number of ring light paths in the integrated optical circulator provided by this embodiment is increased by group. Since every two refractive prisms 21 can provide a group of parallel light paths, the setting angle of the refractive prisms 21 in this scenario is also 45 degrees where no other light-path refractive elements are used.

(2) Optical Isolation Element Group 3

Figure 4:
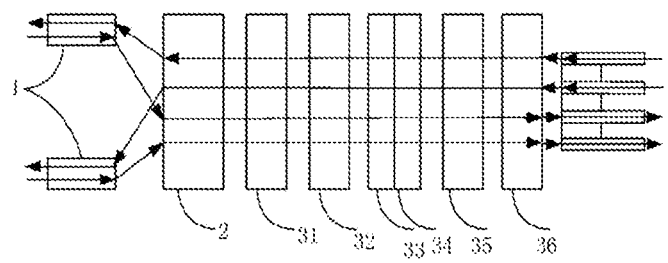
FIG. 4 is a schematic structural diagram of another integrated optical circulator according to an embodiment of the present disclosure.

As shown in FIG. 4, the optical isolation element group 3 includes a first polarization beam-splitting prism 31, a first half-wave plate 32, a first Faraday rotating plate 33, the second Faraday rotating plate 34, the second half-wave plate 35, and the second polarization beam-splitting prism 36. The first polarization beam-splitting prism 31, the first half-wave plate 32, the first Faraday rotating plate 33, the second Faraday rotating plate 34, the second half-wave plate 35 and the second polarization beam-splitting prism 36 are located on the same optical path in sequence. Signal light input from the refractive element group 2 is output to the optical path of the optical isolation element group 3 through the first polarization beam optical splitting 31, and is output to the corresponding outgoing optical fiber of the optical fiber array 4 through the outgoing light path of the second polarization beam optical splitting prism 36; and the signal light input from the optical array 4 is output to the optical path of the optical isolation element group 3 through the second polarization beam-splitting prism 36, and is output to the refractive element group 2 through the outgoing optical path of the first polarization beam-splitting prism 31.

In a specific implementation scenario, in order to realize the function of optical path isolation, the angles of the first Faraday rotating plate 33 and the second Faraday rotating plate 34 are the same as that of a common optical circulator, and is set to 45 degrees. In order to match the deflection angle and the optical path angle of the first Faraday rotating plate 33 and the second Faraday rotating plate 34, the polarization state of the signal light is converted into an appropriate angle, and the angles of the first half-wave plate 32 and the second half-wave plate 35 are set to 22.5 degrees.

In the case that the optical isolation element group 3 is formed by the optical path elements described above, the signal light input from the incident optical fiber of the optical fiber array 4 is divided, by the second polarization splitting prism 36, into two beams of light whose polarization directions are orthogonal to each other, and after the two beams of light pass through the second half-wave plate 35, their polarization directions become parallel to each other; then the two beams of light pass through the second Faraday rotating plate 34 and the first Faraday rotating plate 33 which are set at 45 degrees, their polarization directions respectively rotate 90 degrees, and then the two beams of light pass through the first half-wave plate 32 and the polarization directions of the two beams of light are to be orthogonal with each other again; next, at the first polarization beam-splitting prism 31, the two beams of light are refracted and combined, and then are output from the single-fiber bidirectional optical fiber interface 1. In contrast, the incident light input from the single-fiber bidirectional optical fiber interface 1 is split, by the first polarization beam-splitting prism 31, into two beams of polarized light mutually orthogonal to each other, and after the two beams of polarized light mutually orthogonal to each other pass through the first half-wave plate 32, the polarization directions of the two beams of light are parallel with each other, then after the two beams of light pass through the first Faraday rotating plate 33 and the second Faraday rotating plate 34 which are set at 45 degrees, the polarization directions of the two beams of light rotate at 90 degrees, and then after the two beams of light pass through the second half-wave plate 35, the polarization directions of the two beams of light are orthogonal to each other again, and finally, the two beams of light pass through the second polarization beam-splitting prism 36, and then are output by the corresponding outgoing optical fibers in the optical fiber array 4. Therefore, the separation of the optical paths in the single-fiber bidirectional optical fiber can be realized.

(3) Lens Array 5

Figure 5:
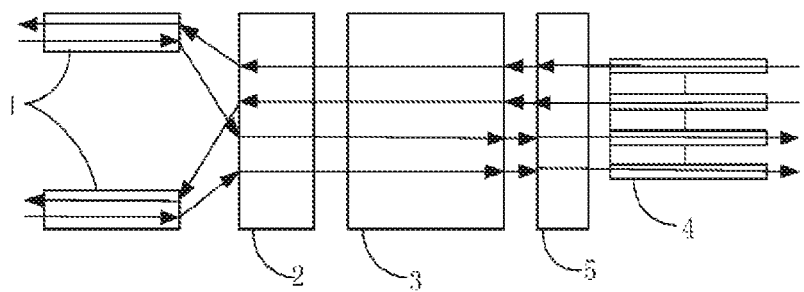
FIG. 5 is a schematic structural diagram of another integrated optical circulator according to an embodiment of the present disclosure.

As shown in FIG. 5, in order to improve the optical path coupling of incident light and outgoing light in the optical fiber array 4, and to improve the power of the optical signal, the integrated optical circulator provided in this embodiment may further comprises a lens array 5, which is located on an optical path between the optical isolation element group 3 and the optical fiber array 4. By means of the lens array 5, the signal light input by each incident optical fiber into the lens array 5 is collimated, and the signal light output by each outgoing optical fiber into the lens array 5 is collimated. In a preferred solution of the present embodiment, in order to simplify the optical path design and avoid mutual interference between optical paths, the number of the lenses in the lens array 5 is the same as the number of the optical fibers in the optical fiber array 4, and the optical path of each optical fiber in the optical fiber array 4 corresponds to one lens in the lens array 5, and each lens in the lens array 5 collimates the optical path of one optical fiber in the optical fiber array 4. In other example scenarios, a suitable number of lenses and other optical elements may be selected according to the specific design of the optical path.

In some embodiments, in order to improve the performance of the lens, avoid the spherical aberration, reduce the volume, and improve the stability of the optical path, an aspheric lens rather than a common spherical lens shall be used as the collimating lens in the lens array 5, wherein a simple aspheric single-sheet plano-convex lens or an aspheric single-sheet biconvex lens may be specifically selected according to optical path precision and collimation requirements.

Since the positions of different optical fibers in the optical fiber array 4 are different, in order to match the angle between the outgoing light from the optical isolation element group 3 and the optical fiber in the optical fiber array 4, the lens array 5 may further comprise a wedge sheet. The wedge sheet is located between the optical isolation element group 3 and the collimating lens in the lens array 5, and the outgoing light of the optical isolation element group 3 changes the angle of the optical path after passing through the wedge sheet to form an optical path matching the angle of each outgoing optical fiber in the optical fiber array 4 and then is output to the corresponding outgoing optical fiber in the optical fiber array 4; and on the other hand, the incident light of each incident optical fiber in the optical fiber array 4 is collimated by the collimating lens, and is changed the angle of the optical path through the wedge sheet to be matched with the optical path of the optical isolation element group 3.

In a specific embodiment, by using the specific optical elements described above, the optical paths of different interfaces in the integrated optical circulator provided in this embodiment are shown in FIG. 6, FIG. 7, FIG. 8 and FIG. 9, and the specific optical path structure is described in detail below. Correspondence among each single-fiber bidirectional optical fiber interface 1, each refractive prism in the refractive element group 2, and each optical fiber in optical fiber array 4 and each lens in lens array 5 in the drawings of the present embodiment is only one optional implementation, and is not used to limit the specific position of each element. The correspondence may be adjusted according to specific optical path element selection and optical path design in actual uses, as long as the optical path logic relationship provided by the present embodiment is satisfied.

In a preferred implementation of the present embodiment, in order to simplify the optical path, the first polarization beam-splitting prism 31 and the second polarization beam-splitting prism 36 respectively select 45-degree parallelogram beam splitting prisms. In an actual usage scenario, a suitable optical device may be selected according to actual optical path requirements to achieve corresponding optical path conversion; for example, a rectangular beam splitting prism is used to cooperate with a reflector, a refractive prism, etc. to achieve a desired optical path.

Figure 6:
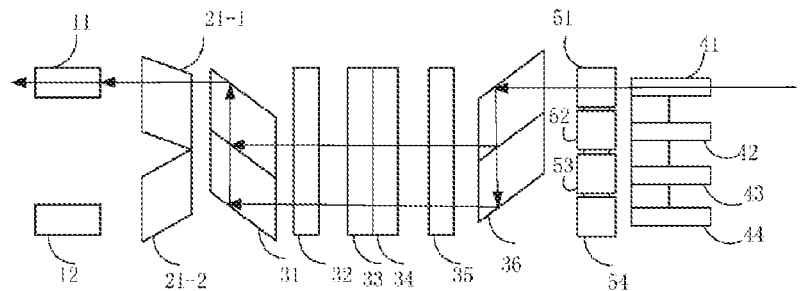
FIG. 6 is a schematic diagram of an optical path of an integrated optical circulator according to an embodiment of the present disclosure.

As shown in FIG. 6, the optical path direction is a direction in which signal light is input by a first incident optical fiber 41 in the optical fiber array 4, and is output by a first single-fiber bidirectional optical fiber interface 11. The signal light is input from the first incident optical fiber 41 and is output to a first lens 51 in the lens array 5; then the signal light is collimated by the first lens 51, and is output to the second polarization splitting prism 36; and then, the second polarization splitting prism 36 divides the signal light into P polarized light and S polarized light, and after P polarized light and S polarized light are reflected by the 45-degree surface of the second polarization splitting prism 36, the propagation directions of the P light and the S light are parallel to each other and the vibration directions thereof are perpendicular to each other. The P polarized light and the S polarized light are output to the second half-wave plate 35. After the second half-wave plate 35 rotates its optical axis, a polarization state of the P polarized light rotates 45 degrees, and a polarization state of the S polarized light rotates 135 degrees. The P polarized light and the S polarized light proceed to be output to the second Faraday rotating plate 34 and the first Faraday rotating plate 33, and after subjected to the optical rotation effect of the second Faraday rotating plate 34 and the first Faraday rotating plate 33, the polarization state of the P polarized light is consistent with the original polarization state and the polarization state of the S polarized light is consistent with the original polarization state. The P polarized light and the S polarized light then are output to the first polarization beam-splitting prism 31 through the half-wave plate 32, and after reflected by the 45 degree plane of the first polarization beam-splitting prism 31, the P polarized light and the S polarized light are fully combined, and then are output to the first single-fiber bidirectional optical fiber interface 11 through a first refractive prism 21-1 in the refractive element group 2, thereby realizing the transmission of signal light from the first incident optical fiber 41 of the optical fiber array to the first single-fiber bidirectional optical fiber interface 11.

Figure 7:
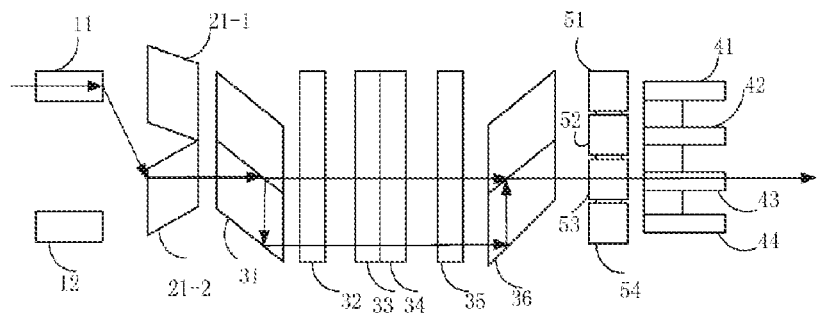
FIG. 7 is a schematic diagram of another optical path of an integrated optical circulator according to an embodiment of the present disclosure.

As shown in FIG. 7, the optical path direction is a direction in which signal light is input by the first single-fiber bidirectional optical fiber interface 11, and output by a first outgoing optical fiber 43. The signal light is input from the first single-fiber bidirectional optical fiber interface 11, output to a second refractive prism 21-2 in the refractive element group 2, and proceeds to be transmitted into the first polarization splitting prism 31. The first polarization splitting prism 31 divides the signal light into P polarized light and S polarized light, and after the P polarized light and the S polarized light are reflected by the 45-degree surface of the first polarization splitting prism 31, the propagation directions of the P polarized light and the S polarized light are parallel to each other and the vibration directions thereof are perpendicular to each other. The P polarized light and the S polarized light are output to the first Faraday rotating plate 33 and the second Faraday rotating plate 34 through the first half-wave plate 32, and due to the optical rotation effect of the first Faraday rotating plate 33 and the second Faraday rotating plate 34, the polarization state of the P polarized light is rotated by 45 degrees and that of the S polarized light is rotated by 45 degrees. The P polarized light and the S polarized light proceed to transmit into the second half-wave plate 35. After the second half-wave plate 35 rotates its optical axis, the polarization state of the P polarized light rotates 135 degrees, and the polarization state of the S polarized light rotates 45 degrees. The direction of the polarization state of the P polarized light is perpendicular to the direction of the original polarization state and the P polarized light is converted into the S polarized light. The polarization state of the S polarized light is perpendicular to the original polarization state and the S polarized light is converted into the P polarized light. The P polarized light and the S polarized light are output to the second polarization beam-splitting prism 36, and after reflected by the 45-degree surface of the second polarization beam-splitting prism 36, the P polarized light and the S polarized light are fully combined and output to a third lens 53 in the lens array 5, and then after collimated by the third lens 53, are output to the first outgoing optical fiber 43 in the optical fiber array 4, thereby realizing the transmission of signal light from the first single-fiber bidirectional optical fiber interface 11 to the first outgoing fiber 43 in the optical fiber array 4.

The optical paths shown in FIGS. 6 and 7 above respectively consist of the first single-fiber bidirectional optical fiber interface 11, the first incident optical fiber 41 and the first outgoing optical fiber 43 as a group of optical path interfaces, which cooperate with other elements in the integrated optical circulator to achieve the function of one optical circulator.

Figure 8:
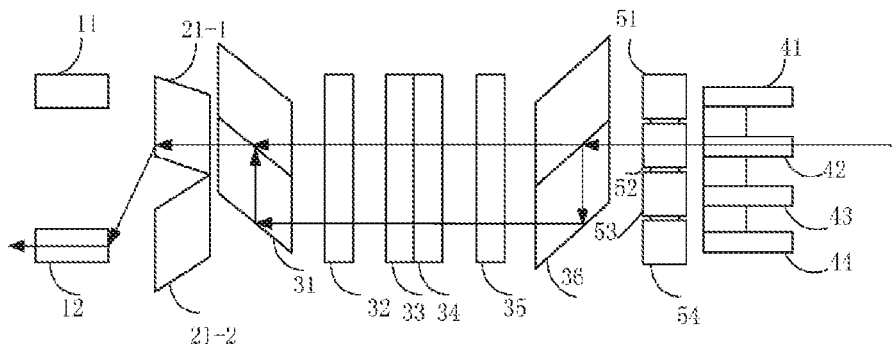
FIG. 8 is a schematic diagram of another optical path of an integrated optical circulator according to an embodiment of the present disclosure.

As shown in FIG. 8, the optical path direction is a direction in which signal light is input by a second incident optical fiber 42 in the optical fiber array 4 and output by a second single-fiber bidirectional optical fiber interface 12. The signal light is input from the second incident optical fiber 42 in the optical fiber array 4 and is output to a second lens 52 in the lens array 5. After being collimated by the second lens 52, the signal light is output to the second polarization beam-splitting prism 36. The second polarization beam-splitting prism 36 divides the signal light into P polarized light and S polarized light. After being reflected on the 45-degree plane of the second polarization beam-splitting prism 36, the propagation directions of the P polarized light and the S polarized light are parallel to each other and the vibration directions thereof are perpendicular to each other. The P polarized light and the S polarized light are output to the second half-wave plate 35. After the second half-wave plate 35 rotates its optical axis, the polarization state of the P polarized light rotates 45 degrees, and the polarization state of the S polarized light rotates 135 degrees. the polarization state of the P polarized light proceed to be output to the second Faraday rotating plate 34 and the first Faraday rotating plate 33, and is subjected to the optical rotation effect of the second Faraday rotating plate 34 and the first Faraday rotating plate 33, then the polarization state of the P polarized light is consistent with the original polarization state in the direction, the polarization state of the S polarized light is consistent with the original polarization state in the direction, and then the polarization state of the P polarized light is output to the first polarization beam-splitting prism 31 through the first half-wave plate 32.

After reflected on the 45-degree plane of the first polarization beam-splitting prism 31, the P polarized light and the S polarized light are fully combined, and output to the second single-fiber bidirectional optical fiber interface 12 through the first refractive prism 21-1 of the refractive element group 2, thereby realizing the transmission of signal light from the second incident optical fiber 42 in the optical fiber array 4 to the second single-fiber bidirectional optical fiber interface 12.

Figure 9:
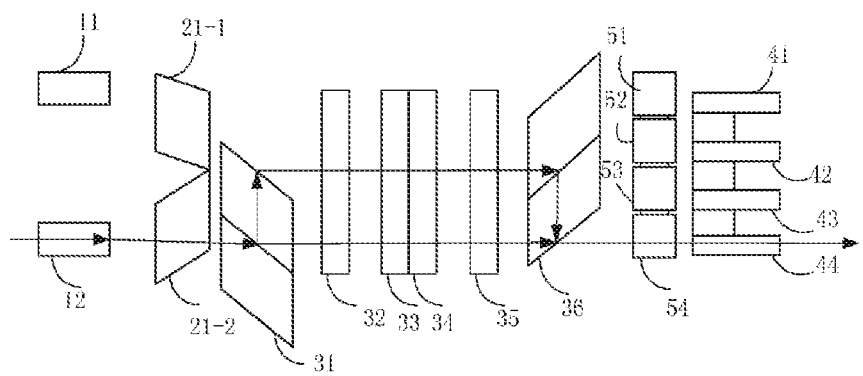
FIG. 9 is a schematic diagram of another optical path of an integrated optical circulator according to an embodiment of the present disclosure.

As shown in FIG. 9, the optical path direction is a direction in which signal light is input from the second single-fiber bidirectional optical fiber interface 12 and outgone from the second outgoing optical fiber 44. The signal light is input from the second single-fiber bidirectional optical fiber interface 12, output to the second refractive prism 21-2 of the refractive element group 2, and proceeds to be transmitted into the first polarization beam-splitting prism 31. The first polarization beam-splitting prism 31 divides the signal light into P polarized light and S polarized light, and after the P polarized light and the S polarized light are reflected on the 45-degree plane of the first polarization beam-splitting prism 31, the propagation directions of the P polarized light and the S polarized light are parallel to each other and the vibration directions thereof are perpendicular to each other. The P polarized light and the S polarized light are output to the first Faraday rotating sheet 33 through the second half-wave plate 32, and are subjected to the optical rotation effect of the first Faraday rotating sheet 33 and the second Faraday rotating sheet 34, then the polarization state of the P polarized light rotates 45 degrees, the polarization state of the S polarized light rotates 45 degrees. the P polarized light and the S polarized light proceeds to be transmitted into the second half-wave plate 35. After the second half-wave plate 35 rotates its optical axis, the polarization state of the P polarized light rotates 135 degrees, and the polarization state of the S polarized light rotates 45 degrees; the direction of the polarization state of the P polarized light is perpendicular to the direction of the original polarization state, and the P polarized light is converted into the S polarized light; and the polarization state of the S polarized light is perpendicular to the original polarization state, the S polarized light is converted into the P polarized light. Then the P polarized light and the S polarized light are output to the second polarization beam-splitting prism 36 through the second half-wave plate 35. After reflected on the 45-degree plane of the second polarization beam-splitting prism 36, the P polarized light and the S polarized light are fully combined, and output to a fourth lens 54 in the lens array 5 through the second polarization beam-splitting prism 36, then are collimated by the fourth lens 54 and output to the second outgoing optical fiber 44 in the optical fiber array 4. As a result, the transmission of the signal light from the second single line bidirectional optical fiber interface 12 to the second outgoing optical fiber 44 in the optical fiber array 4 is realized.

In the optical paths shown in FIG. 8 and FIG. 9, a group of optical path interfaces is composed of the second single-fiber bidirectional optical fiber interface 12, the second incident optical fiber 42, and the second outgoing optical fiber 44, and cooperate with other elements in the integrated optical circulator to achieve the function of another optical circulator.

According to the above description about the structure and optical path, the integrated optical circulator provided in this embodiment can realize the optical path isolation between a plurality of single-fiber bidirectional optical fibers and a corresponding optical fiber array, and the technical effect needs to be achieved by multiple optical circulators in the prior art is achieved by using only one integrated optical circulator. The total volume of the optical circulator in the whole optical fiber system is reduced, the cost is reduced, and the use flexibility and the system integration degree are improved.

In a specific implementation scenario of the present embodiment, the structure of the integrated optical circulator provided by the present embodiment may be optimized in other manners. In a specific application, any combination of the various technical solutions provided in this embodiment may be performed as long as no conflict with each other occurs.

In order to facilitate the connection and application of the optical circulator and the optical fiber, the single-fiber bidirectional optical fiber interface 1 uses a pluggable interface. In a specific application, a pluggable end surface of the single-fiber bidirectional optical fiber interface 1 may be configured as a plane or an inclined surface according to actual requirements, based on different optical path settings, housing shapes, processing manners, etc. When the pluggable end surface of the single-fiber bidirectional optical fiber interface 1 is configured as a plane, the light loss is slightly lower than that of the single-fiber bidirectional optical fiber interface 1 as an inclined surface. In a specific application scenario, the slope angle of the inclined surface is generally set to be 8 degrees.

In some specific examples of the present embodiment, the pluggable end surfaces of the single-fiber bidirectional optical fiber interfaces 1 which are not parallel would cause the optical path coupling to degrade, therefore the pluggable end surfaces of all the single-fiber bidirectional optical fiber interfaces 1 shall be parallel to each other.

In some embodiments, in order to improve the connection accuracy and the connection flexibility, the single-fiber bidirectional optical fiber interface 1 uses a ceramic ferrule, and the SC ceramic ferrule suitable for the connector plug of the FC, SC, ST may be selected according to different types of the optical fiber connector plug, or the LC ceramic ferrule suitable for the connector plug of the LC and MU may also be selected.

The integrated optical circulator provided in this embodiment may be used in various working scenarios where an existing optical circulator may be used, such as in an optical communication system or an optical fiber sensing system, and can achieve the effects of reducing the volume of the optical circulator and improving the integration degree of the system in different scenarios. In order to cooperate with specific application requirements of different scenarios, the optical fiber array 4 may use a conventional optical fiber to reduce costs in an application scenario where the optical fiber does not need to be bent, and use a micro-bent optical fiber to reduce the loss of the optical signal in an application scenario where the optical fiber needs to be bent. the optical fiber array 4 may also use a corresponding type of optical fiber required to be used in other working scenarios of the existing optical circulator.

Figure 10:
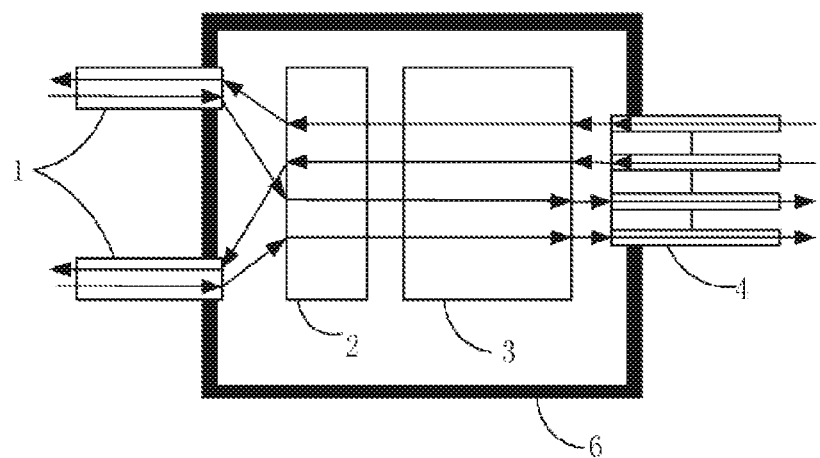
FIG. 10 is a schematic structural diagram of another integrated optical circulator according to an embodiment of the present disclosure.

In order to protect optical devices in the integrated optical circulator, and to avoid damages or influences of the external environment on the optical devices themselves and the optical paths, as shown in FIG. 10, the integrated optical circulator in this embodiment further comprises a housing 6, in which the refractive element group 2 and the optical isolation element group 3 are packaged. The external interfaces of the single-fiber bidirectional optical fiber interface 1 and the optical fiber array 4 are located outside the housing 6, and the optical paths of the single-fiber bidirectional optical fiber interface 1 and the optical fiber array 4 are introduced into the housing 6.

The above specific embodiments can improve the use flexibility, convenience and stability of the integrated optical circulator provided in the present embodiments.

The foregoing is merely preferred embodiments of the present disclosure, and are not intended to limit the present disclosure, and any modification, equivalent replacement, improvement, etc. made within the spirit and principle of the present disclosure should be comprised within the protection scope of the present disclosure.

What is claimed is:

1. An integrated optical circulator comprising at least two single-fiber bidirectional optical fiber interfaces (1), a refractive element group (2), an optical isolation element group (3) and an optical fiber array (4), wherein
the refractive element group (2) and the optical isolation element group (3) are sequentially located on a same optical path;
signal light input from each single-fiber bidirectional optical fiber interface (1) sequentially passes through the refractive element group (2) and the optical isolation element group (3), and then is output by a corresponding outgoing optical fiber in the optical fiber array (4); and
signal light input from each incident optical fiber in the optical fiber array (4) sequentially passes through the optical isolation element group (3) and the refractive element group (2), and then is output by the corresponding single-fiber bidirectional optical fiber interface (1),
wherein the optical isolation element group (3) comprises a first polarization beam-splitting prism (31), a first half-wave plate (32), a first Faraday rotating plate (33), a second Faraday rotating plating (34), a second half-wave plate (35), and a second polarization beam-splitting prism (36),
wherein the first polarization beam-splitting prism (31), the first half-wave plate (32), the first Faraday rotating plate (33), the second Faraday rotating plate (34), the second half-wave plate (35) and the second polarization beam-splitting prism (36) are sequentially located on a same optical path, and signal light output by the refractive element group (2) is output to the optical isolation element group (3) through the first polarization beam-splitting prism (31), and then output to the corresponding outgoing optical fiber in the optical fiber array (4) by the second polarization splitting prism (36); and the signal light output by the optical fiber array (4) is output to the optical isolation element group (3) through the second polarization splitting prism (36), and is then output to the refractive element group (2) by the first polarization splitting prism (31).

2. The integrated optical circulator of claim 1, wherein the refractive element group (2) comprises at least two refractive prisms (21), and
wherein the signal light input from each single-fiber bidirectional optical fiber interface (1) passes through the corresponding refractive prism (21) to reach the optical isolation element group (3), and then is output by the corresponding outgoing optical fiber in the optical fiber array (4); and the signal light input from each incident optical fiber of the optical fiber array (4) passes through the optical isolation element group (3), and then is refracted to the corresponding single-fiber bidirectional optical fiber interface (1) by the corresponding refractive prism (21) for being output.

3. The integrated optical circulator of claim 2, wherein an angle of the refractive prism (21) is calculated according to a number of the single-fiber bidirectional optical fiber interfaces (1) and an optical path angle.

4. The integrated optical circulator of claim 1, wherein the integrated optical circulator further comprises a lens array (5), wherein the lens array (5) is located on an optical path between the optical isolation element group (3) and the optical fiber array (4), and the signal light output by each optical fiber in the optical fiber array (4) passes through the lens array (5) to generate a corresponding collimated light beam.

5. The integrated optical circulator of claim 4, wherein a lens of the lens array (5) is an aspheric single-sheet plano-convex lens and/or an aspheric double-sheet plano-convex lens.

6. The integrated optical circulator of claim 1, wherein the single-fiber bidirectional optical fiber interface (1) is an SC ceramic ferrule, an LC ceramic ferrule, and/or an FC ceramic ferrule.

7. The integrated optical circulator of claim 6, wherein a pluggable end surface of the single-fiber bidirectional optical fiber interface (1) is a plane or an inclined plane.

8. The integrated optical circulator of claim 6, wherein pluggable end surfaces of each single-fiber bidirectional optical fiber interface (1) are parallel to each other.

9. The integrated optical circulator of claim 1, wherein the optical fiber array (4) is a conventional optical fiber or a micro-bending optical fiber.

* * * * *